United States Patent
Lazarev et al.

(10) Patent No.: US 11,633,885 B2
(45) Date of Patent: *Apr. 25, 2023

(54) LAZAREV REACTOR 2: CONTINUOUS PRODUCTION PROCESS OF FILMS OF TWO- DIMENSIONAL POLYMERS

(71) Applicant: 86 Solar Inc., Palo Alto, CA (US)

(72) Inventors: Alexander P. Lazarev, Irvine, CA (US); Pavel I. Lazarev, Menlo Park, CA (US)

(73) Assignee: 86 SOLAR INC., Palo Alto, CA (US)

( * ) Notice: Subject to any disclaimer, the term of this patent is extended or adjusted under 35 U.S.C. 154(b) by 55 days.

This patent is subject to a terminal disclaimer.

(21) Appl. No.: 16/882,165

(22) Filed: May 22, 2020

(65) Prior Publication Data

US 2021/0362377 A1    Nov. 25, 2021

(51) Int. Cl.
| | | |
|---|---|---|
| *B29C 41/52* | (2006.01) | |
| *B29C 41/26* | (2006.01) | |
| *B29C 41/44* | (2006.01) | |
| *B01J 19/24* | (2006.01) | |
| *B01J 19/06* | (2006.01) | |
| *C08J 5/18* | (2006.01) | |
| *B29C 67/24* | (2006.01) | |

(52) U.S. Cl.
CPC ............. *B29C 41/52* (2013.01); *B01J 19/06* (2013.01); *B01J 19/2475* (2013.01); *B29C 41/26* (2013.01); *B29C 41/44* (2013.01); *B29C 67/246* (2013.01); *C08J 5/18* (2013.01); *C08J 2361/02* (2013.01)

(58) Field of Classification Search
CPC ......... B29C 41/52; B29C 41/26; B29C 41/44; B29C 67/246; B01J 19/06; B01J 19/2475; C08J 5/18; C08J 2361/02; B29D 7/01; B29K 2105/041
See application file for complete search history.

(56) References Cited

U.S. PATENT DOCUMENTS

| | | |
|---|---|---|
| 4,973,991 A | 11/1990 | Rajimahers |
| 5,936,106 A | 8/1999 | Asher |
| 11,084,017 B1 * | 8/2021 | Lazarev ............... B01J 19/2485 |
| 2002/0069826 A1 | 6/2002 | Hunt |
| 2003/0217599 A1 | 11/2003 | Peterson, Jr. |
| 2006/0102519 A1 | 5/2006 | Tonkovich |
| 2007/0298166 A1 | 12/2007 | Kool |
| 2010/0176531 A1 | 7/2010 | Tanaka |

* cited by examiner

*Primary Examiner* — S. Behrooz Ghorishi
(74) *Attorney, Agent, or Firm* — David R. Stevens; Stevens Law Group (57) ABSTRACT

The present disclosure provides device having a reaction vessel with one or more permeable membranes disposed therein that separate the reaction vessel into at least a first portion and a second portion. The one or more membranes permit first reactants from a first solution in the first portion or reactants from a second solution in the second portion to seep or percolate to a reaction zone proximate a surface of the one or more membranes. A reaction of the first and second reactants forms a two-dimensional polymer film material. A roller located inside of the reaction vessel draws the two-dimensional polymer film material reaction out of the reaction zone.

20 Claims, 4 Drawing Sheets

LAZAREV REACTOR 2: CONTINUOUS PRODUCTION PROCESS OF FILMS OF TWO-DIMENSIONAL POLYMERS

FIELD OF THE DISCLOSURE

The present disclosure relates generally to process equipment for the continuous production process of organic films. More precisely the present invention relates to chemical reactors for industrial continuous production of two-dimensional polymeric monolayer and two-dimensional polymer multilayer porous polymer films.

BACKGROUND

Two-dimensional polymers that are laterally infinite, one atom- or monomer-unit thin, free-standing, covalent networks with long-range order along two orthogonal directions have attracted intense attention in recent years due to their wide applications in electronics, membrane and sensing (see, Novoselov, K. S. et al., "A roadmap for graphene", Nature 490, 192-200 (2012)). However, the synthesis of graphene involves high-energy procedures, such as chemical vapour deposition (CVD), epitaxial growth and pyrolysis (see, Yang, W. et al., "Epitaxial growth of single-domain graphene on hexagonal boron nitride", Nat. Mater. 12, 792-797 (2013)). The harsh experimental conditions preclude molecular design of graphene on demand. As a first step to rationally synthesize two-dimensional polymers two-dimensional monolayers of porphyrin nanostructures and porous graphene have been constructed on crystalline metal surfaces through Ullmann coupling under ultra-high vacuum conditions (see, Lafferentz, L. et al., "Controlling on-surface polymerization by hierarchical and substrate-directed growth", Nat. Chem. 4, 215-220 (2012) and Bieri, M. et al., "Porous graphenes: two-dimensional polymer synthesis with atomic precision", Chem. Commun. 45, 6919-6921 (2009)). However, the synthesized two-dimensional monolayers are limited to a few nanometers in size, and their release from the underlying substrate is challenging.

As an alternative approach, two-dimensional polymers have been recently achieved through ultraviolet initiated cycloaddition of anthracene-based monomers either in lamellar organic crystals followed by exfoliation into individual layers or at an air-water interface of a Langmuir-Blodgett (LB) film. See, e.g., Kissel, P. et al., "A two-dimensional polymer prepared by organic synthesis", Nat. Chem. 4, 287-291 (2012), Kissel, P., Murray, D. J., Wulftange, W. J., Catalano, V. J. and King, B. T. See also, e.g., Kissel P. et al., "A nanoporous two-dimensional polymer by single-crystal-to-single-crystal photo polymerization", Nat. Chem. 6, 774-778 (2014)). The exfoliation method provides synthetic two-dimension polymers with limited lateral size, typically ranging from a few hundred nanometers to several micrometers, which in the end are determined by crystal sizes. Hafeesudeen Sahabudeen, et al., ("Wafer-sized multifunctional polyimine-based two-dimensional conjugated polymers with high mechanical stiffness", NATURE COMMUNICATIONS|7:1346|DOI: 10.1038/ncomms13461, pp. 1-8, |www.nature.com/naturecommunications) show the successful preparation of porphyrin containing monolayer and multilayer two-dimensional polymers through Schiff-base poly-condensation reaction at an air-water and liquid-liquid interface, respectively. Both the monolayer and multilayer two-dimensional polymers have crystalline structures as indicated by selected area electron diffraction. The monolayer two-dimensional polymer has a thickness of 0.7 nm with a lateral size of 4-inch wafer, and it has a Young's modulus of 267±30 GPa. Notably, the monolayer two-dimensional polymer functions as an active semiconducting layer in a thin film transistor, while the multilayer two-dimensional polymer from cobalt-porphyrin monomer efficiently catalyzes hydrogen generation from water. This work presents an advance in the synthesis of novel two-dimensional materials for electronics and energy-related applications.

Covalent organic frameworks (COFs) have emerged as a promising light-harvesting module for artificial photosynthesis and photovoltaics. For efficient generation of free charge carriers, the donor-acceptor (D-A) conjugation has been adopted for two-dimensional (2D) COFs recently. In the 2D D-A COFs, photoexcitation would generate a polaron pair, which is a precursor to free charge carriers and has lower binding energy than an exciton. Although the character of the primary excitation species is a key factor in determining optoelectronic properties of a material, excited-state dynamics leading to the creation of a polaron pair have not been investigated yet. Authors Tae Wu Kim et al. investigate the dynamics of photogenerated charge carriers in 2D D-A COFs by combining femtosecond optical spectroscopy and non-adiabatic molecular dynamics simulation. See "Ultrafast charge transfer coupled with lattice phonons in two-dimensional covalent organic frameworks", NATURE COMMUNICATIONS (2019) 10:1873|https://doi.org/10.1038/s41467-019-09872-w| www.nature.com/naturecommunications). From this investigation, the authors of this article elucidate that the polaron pair is formed through ultrafast intra-layer hole transfer coupled with coherent vibrations of the 2D lattice, suggesting a mechanism of phonon-assisted charge transfer.

However, the aforementioned articles discussed above did not present or describe the technological equipment that will allow us to switch to the industrial production of two-dimensional porous polymers. It is within this context that aspects of the present disclosure arise.

SUMMARY

The present disclosure overcomes the marked drawbacks in industrial production of two-dimensional monolayer and multilayer porous polymers based on polymerization of monomeric reagents. These multilayer porous polymer films include films such as crystalline films with vertical alignment intended for organic photovoltaic devices for transforming solar energy into electric energy as well as multilayer porous polymer films for all industrial applications that might benefit from nanoscale porous material, e.g., separation and insulation and energy storage applications.

Certain aspects of the present disclosure provide a device having a reaction vessel with one or more permeable membranes disposed therein separating the reaction vessel into at least a first portion and a second portion. The one or more permeable membranes are configured to permit first reactants from a first solution in the first portion or reactants from a second solution in the second portion to seep or percolate to a reaction zone proximate a surface of the one or more membranes. A roller located inside of the reaction vessel is configured to draw a two-dimensional polymer film material formed by reaction of the first and second reactants out from the reaction zone.

Further, aspects of the present disclosure provide a device where the first portion and second portion of the reaction vessel are isolated from one other. One wall of each portion is a permeable membrane and these membranes are located opposite each other, forming an inter-membrane space that acts as the reaction zone. A roller located inside of a third portion of the reaction vessel outside the first and second portions is configured to draw the two-dimensional polymer film material out from the inter-membrane space.

Additional aspects of the present disclosure provide a method for continuous creation of a polymer film material comprising: reacting a first solution and a second solution, wherein the first solution includes a first reactant and the second solution includes a second reactant wherein the first reactant and second reactant are selected to generate a polymerization reaction in at least two dimensions when in contact with each other; contacting a polymerized material formed due to seepage (percolation) of the first reactant from the first solution through the pores of a first membrane, seepage (percolation) of the second reactants from the second solution through the pores of a second membrane and polymerization reaction in the intermembrane space with a roller; and using the roller to draw the polymerized material out from the intermembrane space into a two-dimensional polymer film material.

BRIEF DESCRIPTION OF THE DRAWINGS

These and various other features and advantages of the present invention will become better understood upon reading of the following detailed description in conjunction with the accompanying drawings and the appended claims provided below, where:

DETAILED DESCRIPTION

In the following Detailed Description, reference is made to the accompanying drawings, which form a part hereof, and in which is shown by way of illustration specific embodiments in which the invention may be practiced. In this regard, directional terminology, such as "top," "bottom," "front," "back," "leading," "trailing," etc., is used with reference to the orientation of the figure(s) being described. Because components of embodiments of the present invention can be positioned in a number of different orientations, the directional terminology is used for purposes of illustration and is in no way limiting. It is to be understood that other embodiments may be utilized, and structural or logical changes may be made without departing from the scope of the present invention. The following detailed description, therefore, is not to be taken in a limiting sense, and the scope of the present invention is defined by the appended claims.

The general description of the present invention having been made, a further understanding can be obtained by reference to the specific embodiments, which are given herein only for the purpose of illustration and are not intended to limit the scope of the appended claims.

The present disclosure provides the device as disclosed hereinabove. In one implementation of the disclosed reactor, a depth of the roller is chosen to be the depth of the reaction zone. In another implementation, the reactor vessel further comprises a third portion different from the first and second portions. The one or more permeable membranes include a first permeable membrane and a second permeable membrane inside of the reaction vessel that separate the reaction vessel into the first portion and the second portion. The first and second permeable membranes are located opposite each other such that an inter-membrane space forms the reaction zone. The first permeable membrane is configured to permit first reactants from a first solution to percolate or seep from the first portion into the inter-membrane space and the second permeable membrane is configured to permit second reactants from a second solution to percolate or seep from the second portion into the inter-membrane space. The roller is located inside of the third portion and is configured to draw a two-dimensional polymer film material formed by reaction of the first and second reactants out from the inter-membrane space. In still another implementation of the reactor vessel the roller inside the third portion is approximately parallel to and approximately level with the inter-membrane space. In yet another implementation of the reactor vessel the first permeable membrane and the second permeable membrane are porous. The first permeable membrane is characterized by a pore size chosen to selectively allow the first reactants in the first solution through the first permeable membrane. The second permeable membrane is characterized by a pore size chosen to selectively allow the second reactants in the second solution through the second permeable membrane respectively. The pore size of the first permeable membrane prevents the second reactants in the second solution from traversing through the first permeable membrane and the pore size of the second membrane prevents the first reactants in the first solution from traversing through the second permeable membrane. In one implementation of the reactor vessel the first portion and the second portion are isolated from each other. In another implementation in accordance with aspects of the present disclosure, the reactor further comprises a first liquid circulation loop and a second liquid circulation loop, wherein the first liquid circulation loop is configured to circulate the first solution through the inside of the first portion of the reaction vessel and the second liquid circulation loop is configured to circulate the second solution through the inside of the second portion of the reaction vessel and wherein the first and second liquid circulation loops operate separately from one another.

In still another implementation, the reactor further comprises a first container coupled to the first portion and a second container coupled to the second portion wherein the first container is configured to hold the first solution and the second container is configured to hold the second solution and wherein the first and second containers are configured to provide their contents to the first and second reaction chambers accordingly.

In yet another implementation, the reactor further comprises an evaporator configured to remove solvent vapor that is generated during drying of the polymer film material. In one embodiment of the present disclosure, the reactor further comprises a dryer configured to dry the polymer film material and wherein the dryer is located above third reaction chamber and the roller. The evaporator may for example and without limitation be a fan, a combination heating element and fan or the like. The dryer may include an extractor fan and condenser tubes connected the reaction vessel and configured to condense evaporated solvent and return the condensed solvent back to the reaction vessel. The dryer may be for example an oven, or fan configured to dry out the polymer film. In another embodiment of the present disclosure, the reactor further comprises clamping rollers configured to clamp onto a preform of the two-dimensional polymer film and pull the preform of the two-dimensional polymer film through a drying chamber and raise the edge of the polymer film above the roller. In still another embodiment of the present disclosure, the reactor further comprises a first viscosity regulation container and a first viscosity sensor coupled to the first portion and a second viscosity regulation container and second viscosity sensor coupled to the second portion. The first and second viscosity regulation containers are configured contain and add to the first and second portions inert substances chosen to regulate the viscosity of the first or second solution to ensure the laminar flow of the solutions based on information from the viscosity sensors. In yet another embodiment of the present disclosure, the reactor further comprises a take-up roller configured to pull the polymer film past the roller and roll the polymer film onto a spool. In one embodiment of the present disclosure, the reactor further comprises a first pressure control device and a first pressure sensors coupled to the first portion and a second pressure control device and a second pressure sensor coupled to the second portion. The pressure control devices are configured to regulate the pressure of the first and second solution based on information from the pressure sensors. The pressure control system may include for example and without limitation, solution relief valves, syringes and/or pumps configured to introduce additional solution to a portion of the reaction chamber. Alternately the pressure control system may include for example and without limitation gas bladders gas introduction/relief valves or other device configured to decrease the volume of a portion of the reaction vessel. In another embodiment of the present disclosure, the reactor further comprises an acoustic wave generator that excites the membranes and thereby smooths the inhomogeneities of the flows of the solutions through the membranes.

In another aspect, the present disclosure provides the method for continuous creation of a polymer film material as disclosed above. In one embodiment of the disclosed method the polymer film material is a two-dimensional multilayer porous polymer film. In another embodiment of the present invention the disclosed method further comprises drying the polymer film material and evaporating the solvent vapor generated during drying of the polymer film material with an evaporator. In still another embodiment of the present invention the disclosed method further comprises using a pair of clamping rollers to pull a preform of the polymer film through a drying chamber and raise the edge of the polymer film above the roller. In one embodiment of the disclosed method the chemical reaction in the intermembrane space between the components of reaction is carried out due to the bonds selected from list composing covalent, ionic, and coordination bonds. In another embodiment of the disclosed method the first and the second solution include percolating the first reactant from the first solution through a first membrane and percolating the second reactant from the second solution through a second membrane to an inter-membrane space between the first and second membranes that serves as the reaction zone. In still another embodiment of the disclosed method the first solution and second solution contain photovoltaic donor and acceptor respectively reagents necessary for the formation of donor-bridge-acceptor structures, followed by the formation of a two-dimensional polymer film.

In still another implementation, the disclosed method further comprises measuring the viscosity of the first and second solutions and adding inert substances to the reaction wherein the inert substances are chosen to regulate the viscosity of the first or second solution to ensure the laminar flow of the solutions based on the viscosity measurement.

In yet another implementation, the disclosed method further comprises pulling the polymer film material from the roller with a take-up roller and using the take-up roller to wind the polymer film material onto a spool. In one embodiment of the disclosed method the first reactant includes 5,10,15,20-tetrakis (4-aminophenyl)-21H,23H-porphine and the second reactant includes 2,5-dihydroxyterephthalaldehyde. In another embodiment of the disclosed method the polymerized material includes crystalline films with vertical alignment.

In yet another implementation, the disclosed method further comprises control of pressure in the first reaction chamber and second reaction chamber for optimization of membranes work. In still another embodiment of the present invention the disclosed method further comprises exciting the membranes with an acoustic wave generator.

Figure 1:
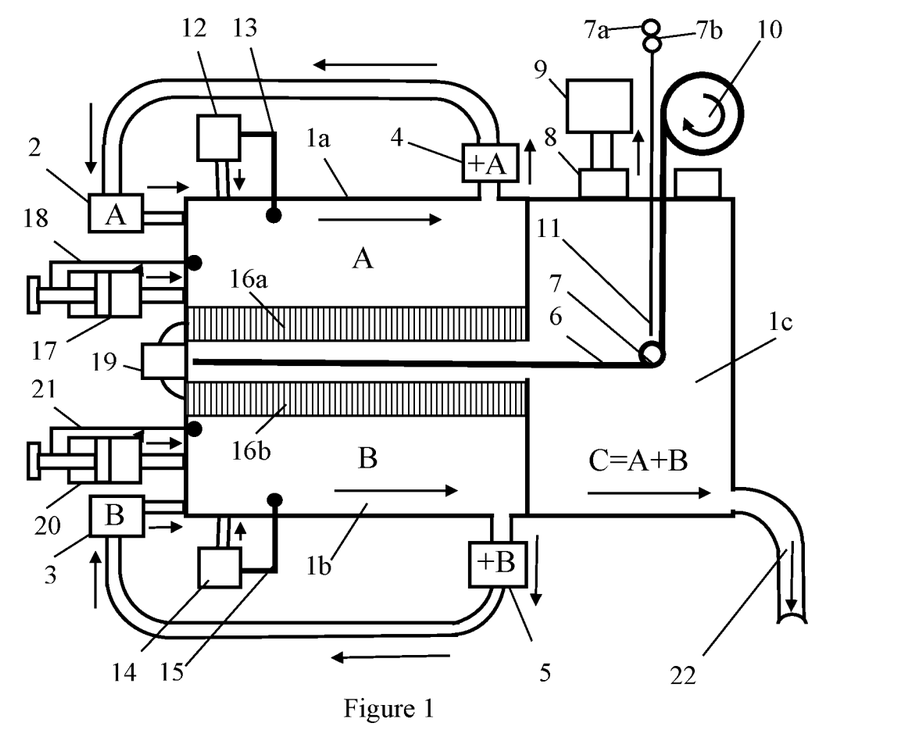
FIG. 1 is a schematic diagram of the main structural elements of a device having a first and second permeable membrane according to aspects of the present disclosure.
Figure 2A:
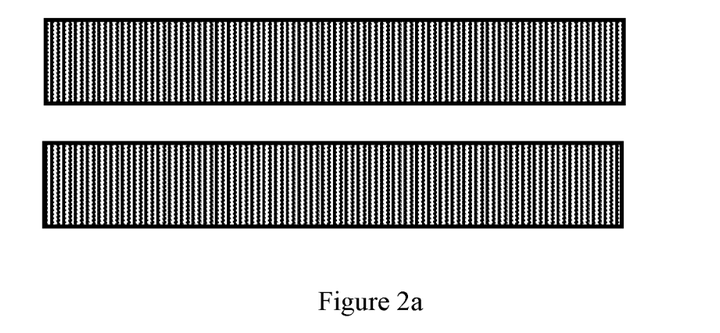
FIGS. 2a-2c schematically show the profiled surfaces of the porous membranes of device having a first and second permeable membrane according to aspects of the present disclosure.
Figure 2B:
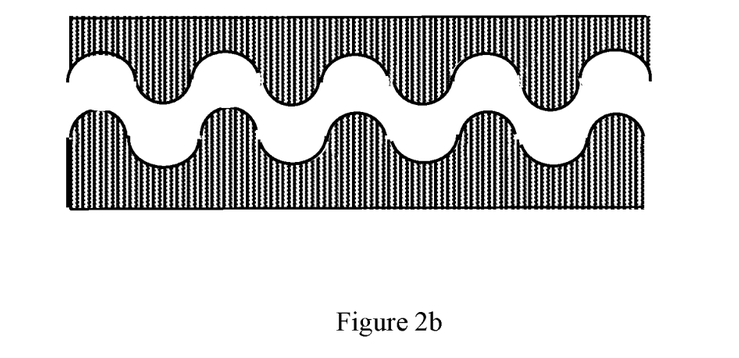
Figure 2C:
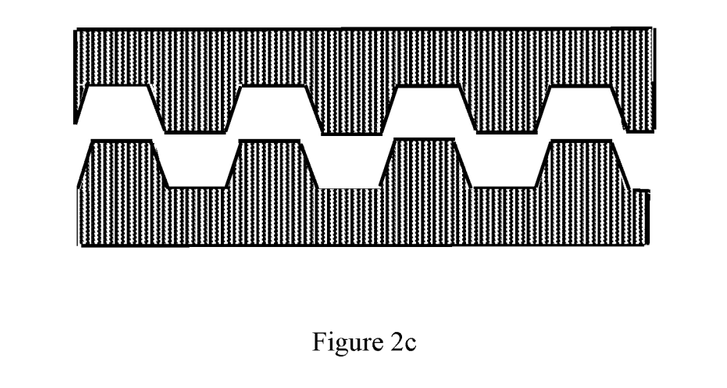

FIG. 1 schematically shows the functional purpose of the main structural elements of the device. This embodiment of the chemical reactor comprises a reaction vessel separated onto three portion 1a, 1b and 1c containing solutions A, B and a mixture of solutions A and B, respectively. One of the walls of the first portion 1a is a removable permeable membrane 16a. Similarly, one of the walls of the second portion 1b is a replaceable permeable membrane 16b. By way of example, and not by way of limitation, these porous membranes may be made of polymer material, ceramics, fiberglass. The surfaces of the membranes may be flat (see, FIG. 2a) or profiled (see, FIGS. 2b and 2c). By way of example, and not by way of limitation, the profiled surfaces of the porous membranes 16a and 16b may have a wavy profile (FIG. 2b) or a trapezoidal profile (FIG. 2c). A two-dimensional polymer 6 is formed in the space between these membranes.

The solution A contains a monomer reagent of the first type, dissolved in a liquid solvent of the first type. The solution B contains a monomer reagent of the second type, dissolved in a liquid solvent of the second type. Unit 2 circulates the solution A in the reactor. Accordingly, unit 3 circulates the solution B in the reactor. First container 4 coupled to the first portion and second container 5 coupled to the second portion are used for control of concentration of reagents in solutions A and B and reagents are replenished in these containers in order to keep concentration of reagents in level that is optimal for the film growth.

The formation of the two-dimensional porous polymer film 6 occurs due to the seepage (percolation) of a solution A containing monomer reagent of the first type through the pores of the membrane 16a and the seepage (percolation) of a solution B containing monomer reagent of the second type through the pores of the membrane 16b, to the area between the membranes where both solutions A and B form of chemical bonds between the mentioned reagents, i.e., covalent bonds, ionic bonds, coordination bonds, and the like.

The first permeable membrane 16a and the second permeable membrane 16b are porous. The first permeable membrane is characterized by a pore size chosen to selectively allow the first reactants in the first solution A through the first permeable membrane 16a. The second permeable membrane 16b is characterized by a pore size chosen to selectively allow the second reactants in the second solution B through the second permeable membrane 16b respectively. The pore size of the first permeable membrane 16a prevents the second reactants in the second solution B from traversing through the first permeable membrane and the pore size of the second membrane 16b prevents the first reactants in the first solution A from traversing through the second permeable membrane.

It should be noted that a device of the type described herein allows the formation of multilayer two-dimensional polymers of any length. In this case, each subsequent layer is formed due to the fact that monomer reagents of first and second type are able to penetrate through the pores of the membrane 16a and 16b and the pores of previously formed layers. Each subsequent layer may be oriented relative to the previous layers due to π-π-interaction. By-products of two-dimensional synthesis and a mixture of solutions A and B formed in the intermembrane space and in chamber 1c is removed from the reactor using a drain 22. A freely rotatable roller 7 controls horizontal position of the formed two-dimensional polymer film as it moves from the third portion 1c into a dryer 8 and to a take-up roller 10. The roller 7 and take-up roller 10 may be cylindrical with lengths greater than or equal to the desired width of the film 6. Solvent vapor and other vapors generated during drying are removed by the evaporator 9. The dried two-dimensional polymer film 6 is rolled up on the take-up roller 10. The polymer material may be rolled around a spool mounted to the take-up roller. The spool may be made of any material for example and without limitation, carboard, plastic, or a metal.

The disclosed reactor comprises a first viscosity regulation container 12 containing inert substances and a first viscosity sensor 13 designed to control and regulate the viscosity of solution A. If solution A uses a polar solvent, such as water, container 12 may introduce polyethylene glycol into the reaction vessel to increase the viscosity of solution A in response to a signal from the viscosity sensor 13. Similarly, a second viscosity regulation container 14 containing inert substances and a second viscosity sensor 15 is provided for the solution B. By way of example, and not by way of limitation, if solution B uses a non-polar solvent, such as chloroform, container 14 may introduce chlorinated ethylene to increase the viscosity of solution B. By way of example, and not by way of limitation, the viscosity sensors 13 and 15 may be a surface acoustic wave sensor in which an oscillating plate is placed in contact with solution A and B, accordingly. The oscillating plate is driven to oscillate laterally at a fixed frequency. Power loss occurring to the solution when the oscillating plate is in contact with to solution can be related to the viscosity of the solution.

FIG. 1 also shows clamping rollers 7a and 7b and a guideline 11 along which these rollers move. The rollers 7a and 7b are elements of the mechanism of pulling the edge of the polymer film preform from the reaction vessel and fixing it to the take-up roller 10.

The main factor influencing the process of percolation (seepage) of solutions A and B through membranes 16a and 16b are the pressures in the first portion 1a and the second portion 1b. There are values of the allowable pressures in these portions, due to these values, the operation of the reactor is ensured. If the pressure in the first portion 1a is less than the set value, a pressure control device (pump) 17 increases it. Therefore, the disclosed reactor has an automatic pressure control system: a pressure sensor 18 and various types of connectors. If the pressure increases above the set value, the membrane 16a will collapse. In this case, pressure control device 17 should reduce the pressure in response to a signal from the pressure sensor 18. Similarly, the pressure of the solution in the second portion 1b is regulated using the pressure control device 20 and the pressure sensor 21.

The second important factor is the temperatures of the solutions A and B. When the temperature increases, the viscosity and density of the solutions A and B decreases, which means that the membranes begin to work more effectively. The pressure increases with temperature, so this parameter also has its own limitations. A temperature regulating device such, a heating element and/or cooling element may be disposed inside the reaction vessel or coupled to the outside of the reaction vessel and configured to transmit or extract heat from the solutions within the reaction vessel.

An important limiter of the membrane is the rate of clogging of its pores. Clogging of the membrane typically occurs for two reasons. In the first case, particles larger than the pores overlap the pore mouths. The worst case here is when the size of the particle and the pore mouth are almost the same, because such a particle can approach the pore and completely block it. Blocking the pore with a much larger particle is less dangerous, since liquid flow is still possible to bypass the particle. In the second case, jumpers are formed when particles of significantly smaller sizes than the pores stick to each other, as well as to the edges of the pore. During the seepage of the solution, these jumpers completely cover the hole of the pore. The lower the membrane clogging rate, the greater the volume of solution that can be passed before the membrane needs to be cleaned or replaced. Therefore, the reactor provides several stages of rough pre-treatment. The more powerful the pre-cleaning, the better. The clogging rate, which is expressed as a decrease in the flow rate of the solution through the membrane over time at the same pressure, is from a practical point of view one of the most important characteristics of the membrane.

Clogging pores can cause the formation of local inhomogeneities (irregularities) in the flows of the solutions A and B leaking through the membranes 16a and 16b. These flow inhomogeneities will lead to the formation of defects in the grown film of the two-dimensional polymer. To prevent this potential disadvantage of the polymer film, the device contains an acoustic wave generator 19 that excites the membranes 16a and 16b and thereby smooths the inhomogeneity of the flows of the solutions A and B through the membrane 16a and 16b and therefore prevents the formation of film defects. Note that excited acoustic waves propagate over flat surface of the membranes (see FIG. 2a), as well as over profiled surfaces of the membranes (see FIGS. 2b and 2c).

Two-dimensional Polymer Film Synthesis Example

In a reactor of the type described herein, it is possible to form a two-dimensional polymer based of chloroform and water in which 5,10,15,20-tetrakis (4-aminophenyl)-21H, 23H-porphine (monomer 1) or 5,10,15,20-tetrakis (4-aminophenyl)-21H, 23H-porphyrin-Co(II) (monomer 2) and 2,5-dihydroxyterephthalaldehyde (monomer 3) are dissolved, respectively.

The width of the film produced by reaction may be controlled by the width of the space between the two opposed membranes (the intermembrane space) in which solutions A and B interface with each other and allow a two-dimensional polymerization reaction to take place. Width might be controlled by inserts that are positioned on the sides of reactor proximate the intermembrane space and restrict the width of the intermembrane space to a width that is less than or equal to the width of the roller 7. Such inserts may be repositioned laterally as required to meet specifications for the width of the target product made from the two-dimensional polymer film 6. Widths ranging from a few centimeters, e.g., 2 to 100 centimeters, to a few meters, e.g., 1 to 10 meters, are envisaged although larger or smaller films are within the scope of the present disclosure.

Growth of thickness of the film 6 depends on the rate of seepage (percolation) of a solution A containing monomer reagent of the first type through the pores of the membrane 16a and the seepage (percolation) of a solution B containing monomer reagent of the second type through the pores of the membrane 16b, to the area between the membranes where both solutions A and B form of chemical bonds between the mentioned reagents, i.e., covalent bonds, ionic bonds, coordination bonds, and the like. The thickness of the film may be therefore be controlled by controlling the time that the film 6 is allowed to be in the intermembrane space of solutions A and B. Other factors that affect film thickness include speed of removal of the film 6 from the reaction vessel 1, e.g., the rate of rotation of the take-up roller 10, and the size of pores in the two-dimensional polymer film 6, which can affect the speed of diffusion of reactants.

The length of the film 6 may be arbitrary and limited mainly by the capacity of the roller 10, which depends partly on the film thickness, and the availability of reactants for solutions A and B. Films of several tens of meters to several hundreds of meters or even several thousands of meters are envisaged.

Figure 3:
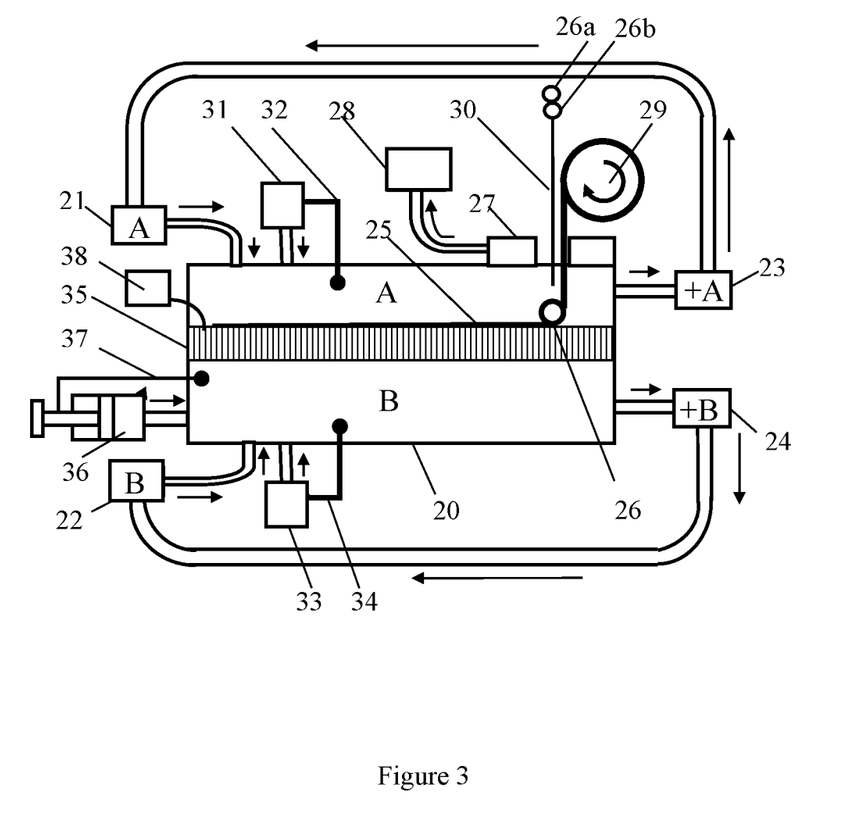
FIG. 3 is a schematic diagram of the main structural elements of a device having a permeable membrane according to other aspects of the present disclosure.
Figure 4A:
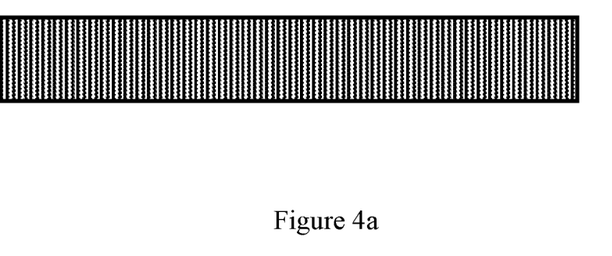
FIGS. 4a-4c schematically show the profiled surfaces of the porous membranes of device having a permeable membrane according to other aspects of the present disclosure.
Figure 4B:
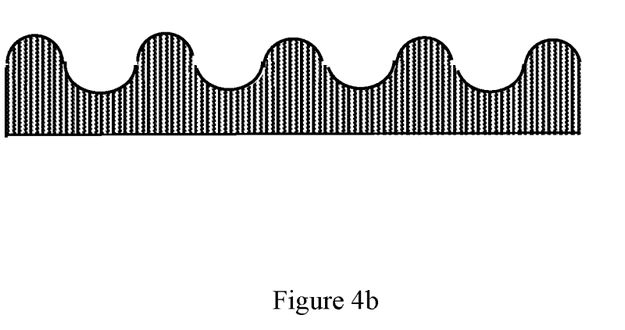
Figure 4C:
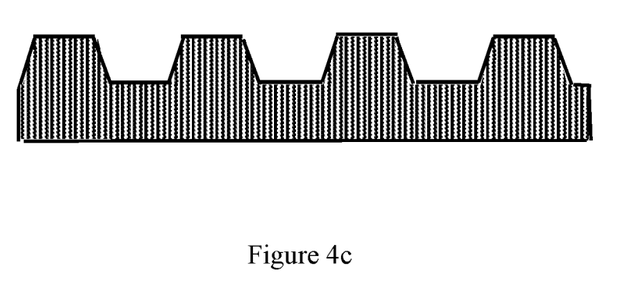

FIG. 3 schematically shows another embodiment of the device. The reaction vessels 20 contains two solutions A and B, which are separated by a porous permeable membrane 35. By way of example, and not by way of limitation, the porous permeable membrane 35 may be made of polymer material, ceramics, fiberglass. The surface of the membrane on which the two-dimensional polymer 25 is formed may be flat (see, FIG. 4a) or profiled (see, FIGS. 4b and 4c). By way of example, and not by way of limitation, the profiled surface of the permeable membrane 35 may have a wavy profile (FIG. 4b) and profile with trapezoidal corrugations (FIG. 4c). Solution A contains a monomer reagent of a first type, dissolved in a liquid solvent of the first type. Solution B contains a monomer reagent of a second type, dissolved in a liquid solvent of the second type. First type monomer reagents can dissolve in first type solvents but not second type solvents. Likewise, second type monomer reagents can dissolve in second type solvents but not first type solvents. Solutions A and B can be either miscible or immiscible.

A first circulating unit 21 circulates solution A in an upper portion of the reaction vessel 20. Accordingly, a second circulating unit 22 circulates solution B in a lower portion of the reactor vessel 20. First container 23 coupled to the upper portion and second container 24 coupled to the lower portion are used for control of concentration of reagents in solutions A and B and reagents are replenished from these containers in order to maintain concentration of reagents in solutions A and B at levels that are optimal for growth of the film 25. The formation of the two-dimensional porous polymer film 25 occurs due to the seepage (percolation) of a solution B containing monomer reagent of the second type through the pores of the membrane 35 and the diffusion of monomer reagents of the first type from solutions A to the membrane surface, where both solutions A and B form of chemical bonds between the mentioned reagents, i.e., covalent bonds, ionic bonds, coordination bonds, and the like.

Device of the type described herein allows the formation of multilayer two-dimensional polymers of any length. Each subsequent layer is formed due to the fact that monomer reagents are able to penetrate through the pores of the membrane 35 and the pores of previously formed layers. Each subsequent layer may be oriented relative to the previous layers due to $\pi$-$\pi$-interaction. By-products of two-dimensional synthesis are filtered during the circulation of solutions. Freely rotatable roller 26 controls horizontal position of the formed two-dimensional polymer film as it moves from the reaction vessel 20 into a dryer 27 and to a take-up roller 29. The roller 26 and take-up roller 29 may be cylindrical with lengths greater than or equal to the desired width of the film 25. Solvent vapor and other vapors generated during drying are removed by the evaporator 28. The dried two-dimensional polymer film 25 is rolled up on the take-up roller 29. The polymer material may be rolled around a spool mounted to the take-up roller.

The disclosed chemical reactor comprises a viscosity regulation container 31 containing inert substances and a viscosity sensor 32 designed to control and regulate the viscosity of solution A. If solution A uses a polar solvent, such as water, viscosity regulation container 31 may introduce polyethylene glycol into the reaction vessel to increase the viscosity of solution A in response to a signal from the viscosity sensor 32. Similarly, a viscosity regulation container 33 containing inert substances and viscosity sensor 34 is provided for the solution B. By way of example, and not by way of limitation, if solution B uses a non-polar solvent, such as chloroform, viscosity regulation container 33 may introduce chlorinated ethylene to increase the viscosity of solution B. By way of example, and not by way of limitation, the viscosity sensors 32 and 34 may be a surface acoustic wave sensor in which an oscillating plate is placed in contact with solution A and B, accordingly. The oscillating plate is driven to oscillate laterally at a fixed frequency. Power loss occurring to the solution when the oscillating plate is in contact with to solution can be related to the viscosity of the solution.

FIG. 3 also shows clamping rollers 26a and 26b and a guideline 30 along which these rollers move. The rollers 26a and 26b are elements of the mechanism of pulling the edge of the polymer film preform from the reaction vessel 20 and fixing it to the take-up roller 29.

The main factor influencing the process of percolation (seepage) of a solution is the pressure in the solution B. There is a value of the allowable pressure, due to this value, the operation of the reactor is ensured. If the pressure is less than the set value, a pressure control device (pump) 36 increases it. Therefore, the disclosed reactor has an automatic pressure control system: a pressure sensor 37 and various types of connectors. If the pressure increases above the set value, the membrane will collapse. In this case, the pressure control device 36 should reduce the pressure in response to a signal from the pressure sensor 37. The second important factor is the temperature of the solution. When the temperature increases, the viscosity and density of the solution B decreases, which means that the membrane begins to work more effectively. The pressure increases with temperature, so this parameter also has its own limitations.

Clogging pores can cause the formation of local inhomogeneities (irregularities) in the flow of the solution B leaking through the membrane 35. These flow inhomogeneities will lead to the formation of defects in the grown film of the two-dimensional polymer. To prevent this potential disadvantage of the polymer film, the Device contains an acoustic wave generator 38 that excites the membrane surface and thereby smooths the inhomogeneity of the flow of the solution B through the membrane 35 and therefore prevents the formation of film defects.

device-2 as described herein allows for industrial production of two-dimensional polymeric monolayer and two-dimensional polymer multilayer porous polymer films for organic photovoltaic devices intended for transforming solar energy into electric energy. devices according to aspects of the present disclosure may also be used in manufacturing of films for industrial applications outside of photovoltaic devices. Examples of such applications include, but are not limited to, production of two-dimensional polymer films for the food and chemical industries for separation and filtration purposes as well as gas separation and gas storage, as well as electric insulation and electric energy storage. Applications of Device and the two-dimensional polymer films they produce are not limited to these applications. Although aspects of the present disclosure have been described in detail with reference to some certain implementations, persons possessing ordinary skill in the art to which this disclosure pertains will appreciate that various modifications and enhancements may be made without departing from the spirit and scope of the claims that follow. Any feature, whether preferred or not may be combined with any other feature whether preferred or not. It should be understood that various alternatives to the embodiments of the invention described herein can be employed in practicing the invention. It is intended that the following claims define the scope of the invention and that methods and structures within the scope of these claims and their equivalents be covered thereby. The appended claims are not to be interpreted as including means-plus-function limitations, unless such a limitation is explicitly recited in a given claim using the phrase "means for."

What is claimed is:

1. A device comprising:
   a reaction vessel having one or more permeable membranes disposed therein separating the reaction vessel into at least a first portion and a second portion, wherein the one or more permeable membranes are configured to permit first reactants from a first solution in the first portion or second reactants from a second solution in the second portion to percolate or seep to a reaction zone proximate a surface of the one or more membranes; and
   a roller located inside of the reaction vessel configured to draw a two-dimensional polymer film material formed by reaction of the first and second reactants out from the reaction zone.

2. The device of claim 1,
   wherein the reaction vessel further includes a third portion different from the first and second portions, wherein the one or more permeable membranes include a first permeable membrane and a second permeable membrane inside of the reaction vessel that separate the reaction vessel into the first portion and the second portion, wherein the first and second permeable membranes are located opposite each other such that an inter-membrane space forms the reaction zone, wherein the first permeable membrane is configured to permit first reactants from the first solution to percolate or seep from the first portion into the inter-membrane space and wherein the second permeable membrane is configured to permit second reactants from the second solution to percolate or seep from the second portion into the inter-membrane space; and
   wherein the roller is located inside of the third portion and is configured to draw a two-dimensional polymer film material formed by reaction of the first and second reactants out from the inter-membrane space.

3. The device of claim 2, wherein the roller is approximately parallel to and approximately level with the inter-membrane space.

4. The device of claim 2, wherein the first permeable membrane and the second permeable membrane are porous.

5. The device of claim 2, further comprising a dryer configured to dry the polymer film material and wherein the dryer is located above the third portion of the reaction vessel and the roller.

6. The device of claim 1, wherein the first portion and the second portion are isolated from each other.

7. The device of claim 1, further comprising a first liquid circulation loop and a second liquid circulation loop, wherein the first liquid circulation loop is configured to circulate the first solution through the inside of the first portion of the reaction vessel and the second liquid circulation loop is configured to circulate the second solution through the inside of the second portion of the reaction vessel and wherein the first and second liquid circulation loops operate separately from one another.

8. The device of claim 1, further comprising a first container coupled to the first portion and a second container coupled to the second portion wherein the first container is configured to hold the first solution and the second container is configured to hold the second solution and wherein the first and second containers are configured to provide their contents to the first portion and second portion respectively.

9. The device of claim 1, further comprising an evaporator configured to remove solvent vapor generated during drying of the polymer film material.

10. The device of claim 1, further comprising clamping rollers configured to clamp onto a preform of the polymer film material and pull the preform of the polymer film material through a drying chamber and raise the edge of the polymer film material above the roller.

11. The device of claim 1, further comprising a first viscosity regulation container and a first viscosity sensor coupled to the first portion and a second viscosity regulation container and a second viscosity sensor coupled to the second portion wherein the first and second viscosity regulation containers are configured to contain and add to the first and second portions inert substances chosen to regulate the viscosity of the first or second solution to ensure a laminar flow of the solutions based on information from the viscosity sensors.

12. The device of claim 1, further comprising a take-up roller configured to pull the polymer film material past the roller and roll the polymer film material onto a spool.

13. The device of claim 1, further comprising a first pressure control device and a first pressure sensor coupled to the first portion and a second pressure control device and a second pressure sensor coupled to the second portion wherein the pressure control devices are configured to regulate the pressure of the first and second solution based on information from the pressure sensors.

14. The device of claim 1, further comprising an acoustic wave generator configured to excite the one or more membranes.

15. A device comprising:
    a reaction vessel having a membrane disposed therein and configured to permit first reactants from a first solution or second reactants from a second solution to enter a reaction zone proximate a surface of the membrane by one of: percolation or seepage; and a roller located inside of the reaction vessel configured to draw a two-dimensional polymer film material formed by reaction of the first and second reactants out from the reaction zone.

16. The device of claim 15, further comprising a take-up roller configured to pull the polymer film material past the roller and roll the polymer film material onto a spool.

17. The device of claim 15, further comprising a dryer configured to dry the polymer film material.

18. The device of claim 17, further comprising an evaporator configured to remove solvent vapor generated during drying of the polymer film material.

19. The device of claim 15, further comprising clamping rollers configured to clamp onto a preform of the polymer film material and pull the preform of the polymer film material through a drying chamber and raise the edge of the polymer film material above the roller.

20. The device of claim 15, further comprising an acoustic wave generator configured to excite the one or more membranes.

* * * * *